(12) United States Patent
Lin et al.

(10) Patent No.: US 7,379,146 B2
(45) Date of Patent: May 27, 2008

(54) FRINGE FIELD SWITCHING MODE LIQUID CRYSTAL DISPLAY DEVICE FOR REDUCING COLOR SHIFT

(75) Inventors: Tze-Min Lin, Miao-Li (TW); Chiu-Lien Yang, Miao-Li (TW); Chueh-Ju Chen, Miao-Li (TW); Jia-Pang Pang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 346 days.

(21) Appl. No.: 11/111,340

(22) Filed: Apr. 20, 2005

(65) Prior Publication Data

US 2005/0231676 A1 Oct. 20, 2005

(30) Foreign Application Priority Data

Apr. 20, 2004 (TW) ............................. 93110936 A

(51) Int. Cl.
*G02F 1/1343* (2006.01)
(52) U.S. Cl. .................. 349/146; 349/141; 349/145
(58) Field of Classification Search .............. 349/145, 349/146
See application file for complete search history.

(56) References Cited

U.S. PATENT DOCUMENTS

2002/0036743 A1* 3/2002 Youn et al. ................. 349/141
2002/0057411 A1* 5/2002 Kim et al. .................. 349/141

* cited by examiner

*Primary Examiner*—David Nelms
*Assistant Examiner*—Richard H Kim
(74) *Attorney, Agent, or Firm*—Wei Te Chung

(57) ABSTRACT

A fringe field switching liquid crystal display (FFS-LCD) device (200) includes a first substrate (210) and a second substrate (220) disposed opposite to each other and spaced apart a predetermined distance, a liquid crystal layer (250) interposed between the first and second substrates, a plurality of gate lines (233) and data lines (234) formed on the second substrates, thereby defining a plurality of pixel regions, and a plurality of pixel electrodes (223) and a plate-like common electrode (221) provided in each of the pixel regions. The pixel electrodes have a plurality of curving comb portions so as to generate a continuous variation electric field between the pixel and common electrodes. Liquid crystal molecules in the FFS-LCD device are twisted in different continuous directions so as to reduce the color shift.

12 Claims, 4 Drawing Sheets

FRINGE FIELD SWITCHING MODE LIQUID CRYSTAL DISPLAY DEVICE FOR REDUCING COLOR SHIFT

The present invention relates to liquid crystal display (LCD) devices, and especially to a fringe field switching (FFS) mode LCD device with wide viewing angle for reducing color shift.

BACKGROUND

LCD devices are used as displays on a variety of devices such as, for example, computer monitors and motor vehicle cruise control panels. Existing LCD types include, for example, the twisted nematic liquid crystal display (TN-LCD) and the in-plane switching liquid crystal display (IPS-LCD). The TN-LCD often has the problem of a narrow viewing angle, and so the IPS-LCD was developed to overcome this disadvantage. The IPS-LCD typically has one or more common electrodes and a plurality of pixel electrodes all disposed on one of two opposite substrates. The electrodes drive liquid crystal molecules interposed between the substrates with an electric field. The resulting electric field is substantially in a plane parallel to the substrates. Such a configuration provides a wide viewing angle.

However, the common electrodes and pixel electrodes are formed of opaque metals, giving the IPS-LCD a low aperture ratio and low transmittance. Thus a fringe field switching liquid crystal display (FFS-LCD) with a flat plate-like common electrode has been developed in order to improve on the aperture ratio and transmittance. The FFS-LCD is characterized by its driving electric field, which is between each pixel electrode and the common electrode. Because the common electrode is transparent, the FFS LCD can typically attain a higher aperture ratio and a higher transmittance.

FIG. 4 is a schematic, cross-sectional view of a conventional FFS-LCD 1. The FFS-LCD 1 includes an upper substrate 20 and an opposite lower substrate 10, with the substrates 20, 10 being spaced apart a predetermined distance. A liquid crystal layer 50 having a multiplicity of liquid crystal molecules (not labeled) is disposed between the upper and lower substrates 20, 10. A backlight module (not shown) is disposed under the lower substrate 10 for providing illumination.

A common electrode 11 and a plurality of pixel electrodes 13 are disposed at the lower substrate 10, with an insulating layer 15 interposed between the common electrode 11 and the pixel electrodes 13. A lower alignment film 14 is formed on the insulating layer 15, such that the lower alignment film 14 also covers the pixel electrodes 13. A color filter 25 and an upper alignment film 24 are formed on an inner surface of the upper substrate 20, in that order from top to bottom.

Also referring to FIG. 5, two gate lines 3 and two data lines 7 define a pixel area of the FFS-LCD 1. The data lines 7 are parallel to but spaced apart from each other, and are substantially perpendicular to the gate lines 3.

Pixel electrodes 13 and common electrode 11 are formed in the pixel area. The pixel and common electrodes 13, 11 are made of a transparent conductive material such as indium-tin-oxide (ITO) or indium-zinc-oxide (IZO). The pixel electrodes 13 include a plurality of comb portions (not labeled) substantially parallel to each other, and are electrically connected to the source line 7a of the TFT (not labeled) through a contact hole thereof.

The comb portions of the pixel electrodes 13 are parallel to each other, and are all oriented in a first direction. When the FFS-LCD 1 is driven, a fringe electric field is formed between the common electrode 11 and each pixel electrode 13. The liquid crystal molecules disposed over the common electrode 11 and pixel electrodes 13 are driven by this electric field and have a corresponding orientation. Then, the liquid crystal molecules are rotated only in a single direction. This means that an associated display screen exhibits color shift when the display screen is obliquely viewed while displaying white.

Referring to FIG. 6, a schematic, plan view of a pixel area of another FFS-LCD is shown. Comb portions of pixel electrodes 23 are substantially parallel to each other. Each comb portion has an elbow section, such that the comb portion is bent. When a voltage is applied between the pixel and common electrodes 23, 21, a horizontal in-plane electric field in two directions is established between the pixel and common electrodes 23, 21. Then, the liquid crystal display device has two domains so as to reduce color shift.

However, because each of the comb portions of the pixel electrodes 23 includes an elbow portion, and the electric field yielded near the elbow portion is liable to be distorted. Liquid crystal molecules at the elbow portion may be or abnormally oriented. Thus, the display quality of the FFS-LCD would be impaired.

What is needed, therefore, is a fringe field switching mode liquid crystal display device which has reduced color shift and which provides relatively uniform display quality.

SUMMARY

A fringe field switching liquid crystal display (FFS-LCD) device includes a first substrate and a second substrate disposed opposite to each other and spaced apart a predetermined distance, a liquid crystal layer interposed between the first and second substrates, a plurality of gate lines and data lines formed on the first substrates, thereby defining a plurality of pixel regions, and a plurality of pixel electrodes and a plate-like common electrode provided in each of the pixel regions. The pixel electrodes have a plurality of curving comb portions.

Because the pixel electrodes include curving comb portions, when a voltage is applied between the pixel and common electrodes, a horizontal in-plane electric field along different directions that is parallel to a surface of the substrates is established between the curving comb portions of the pixel electrodes and common electrodes. The liquid crystal molecules are twisted so as to align according to the electric field. That is, the liquid crystal molecules in the FFS-LCD device are twisted in different directions so as to reduce the color shift. Furthermore, the curving comb portions are smooth so as to avoid generating electric field being abnormal similar to the bended portions of the pixel electrodes in conventional FFS-LCD.

Other objects, advantages, and novel features of the embodiment will become more apparent from the following detailed description when taken in conjunction with the accompanying drawings.

DETAILED DESCRIPTION OF PREFERRED EMBODIMENTS

Figure 1:
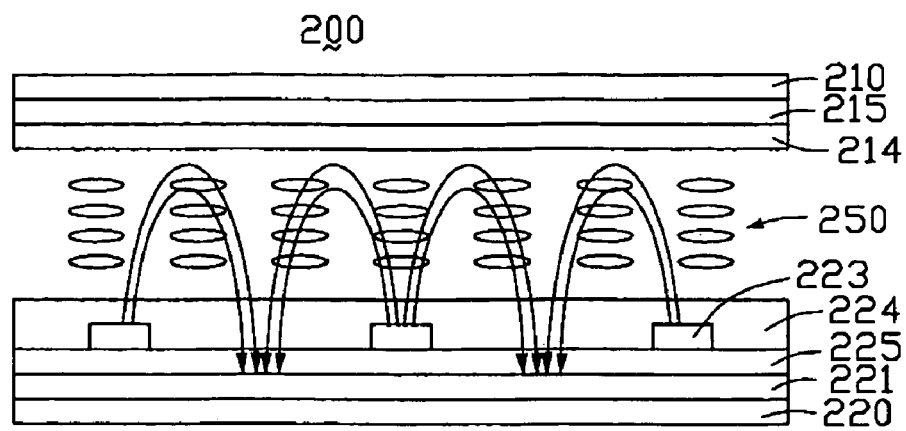
FIG. 1 is a schematic, side cross-sectional view of part of an FFS-LCD device according to a first embodiment of the present invention, when a voltage is applied thereto.

FIG. 1 is a schematic, side cross-sectional view of part of an FFS-LCD device 200 according to a first embodiment of the present invention, when a voltage is applied thereto. The FFS-LCD device 200 includes a transparent first substrate 210, a transparent second substrate 220, and a liquid crystal layer 250 sandwiched between the first and second substrates 210, 220.

A color filter 215 is provided on an inner surface of the first substrate 210 generally opposite to the second substrate 220. An alignment film 214 is coated on a surface of the color filter 215 that is opposite to the second substrate 220.

A common electrode 221 is directly formed on an inner surface of the second substrate 220, and an insulating layer 225 is formed on the common electrode 221. Pixel electrodes 223 are directly formed on a surface of the insulating layer 225, and an alignment film 224 222 is formed on the pixel electrodes 223 such that it also covers the insulating layer 225. The liquid crystal layer 250 is sandwiched directly between the alignment films 214, 224.

Figure 2:
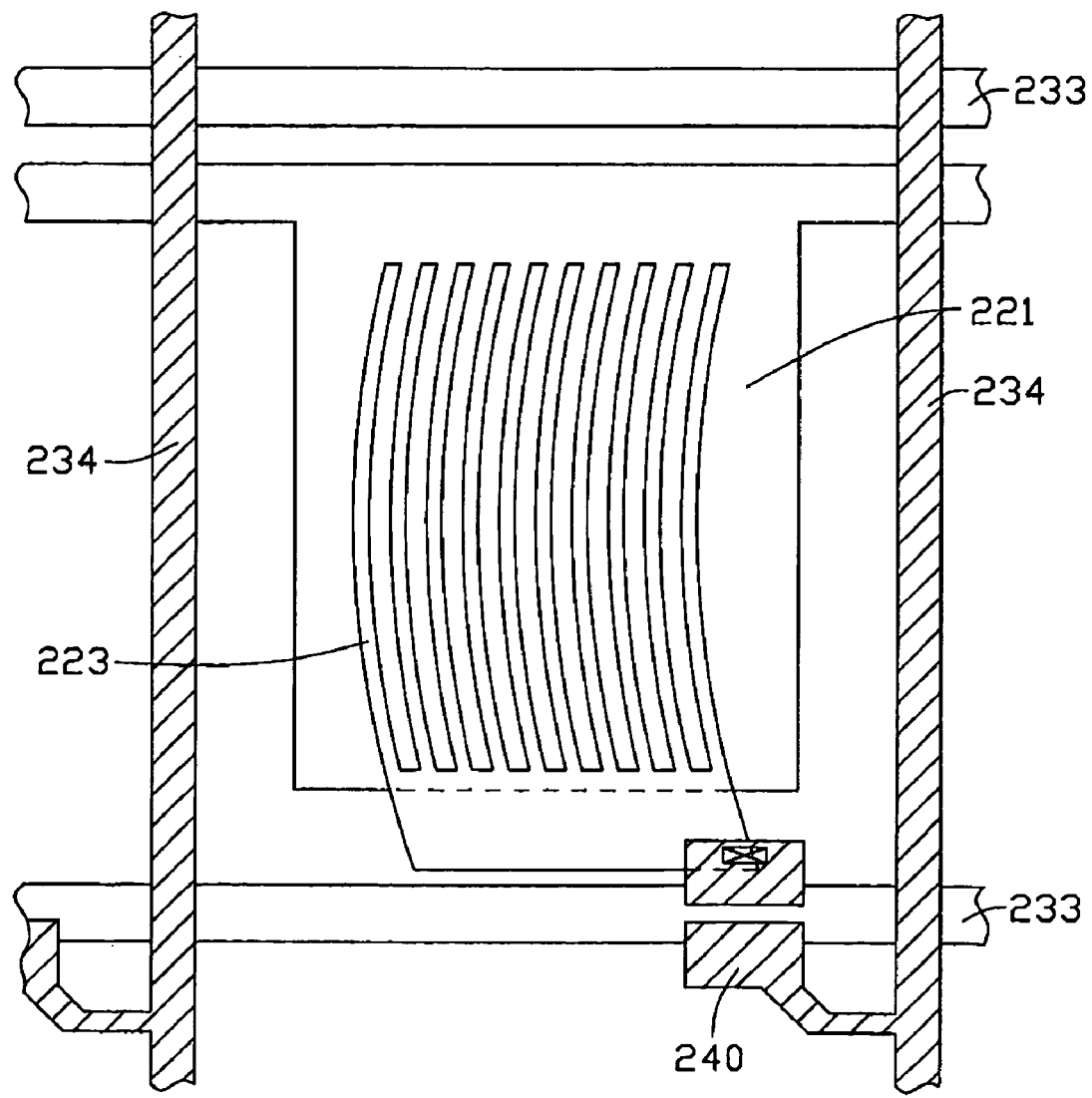
FIG. 2 is a top plan view of a configuration of electrodes of the FFS-LCD device of FIG. 1.

Also referring to FIG. 2, two parallel gate lines 233 orthogonally cross two parallel data lines 234, thereby defining a rectangular pixel region. A TFT device 240, a plate-like common electrode 221, and a plurality of pixel electrodes 223 are provided in the pixel region.

The pixel and common electrodes 223, 221 are made of a transparent conductive material such as indium-tin-oxide (ITO) or indium-zinc-oxide (IZO). The pixel electrodes 223 share a common central wiring (not labeled) connecting to a drain electrode (not labeled) of the TFT device 240, the wiring being disposed essentially parallel to the gate lines 233. The pixel electrodes 223 include a plurality of curving comb portions extending from the wiring. In the illustrated embodiment, the curving comb portions are arcuate.

In operation, a common voltage is applied to the common electrodes 221, and another voltage is applied to the pixel electrodes 223. A horizontal electric field in different directions is thereby established, with successive contiguous directions continuously varying. The electric field causes liquid crystal molecules in the liquid crystal layer 250 to be twisted in a plane that is parallel to the substrates 210 and 220, for controlling a corresponding display.

According to the configuration of the common and pixel electrodes 221, 223, an electric field is generated in different directions, so as to form a continuous domain in spaces defined between the common and pixel electrodes 221, 223. Accordingly, the liquid crystal molecules in the liquid crystal layer 250 are twisted in different directions in a gradually changing continuum.

As a result, when the display screen is obliquely viewed while displaying white, different colors can be seen in two regions of the display screen corresponding to said continuous domain in said space. The colors compensate for each other, thereby reducing color shift.

Figure 3:
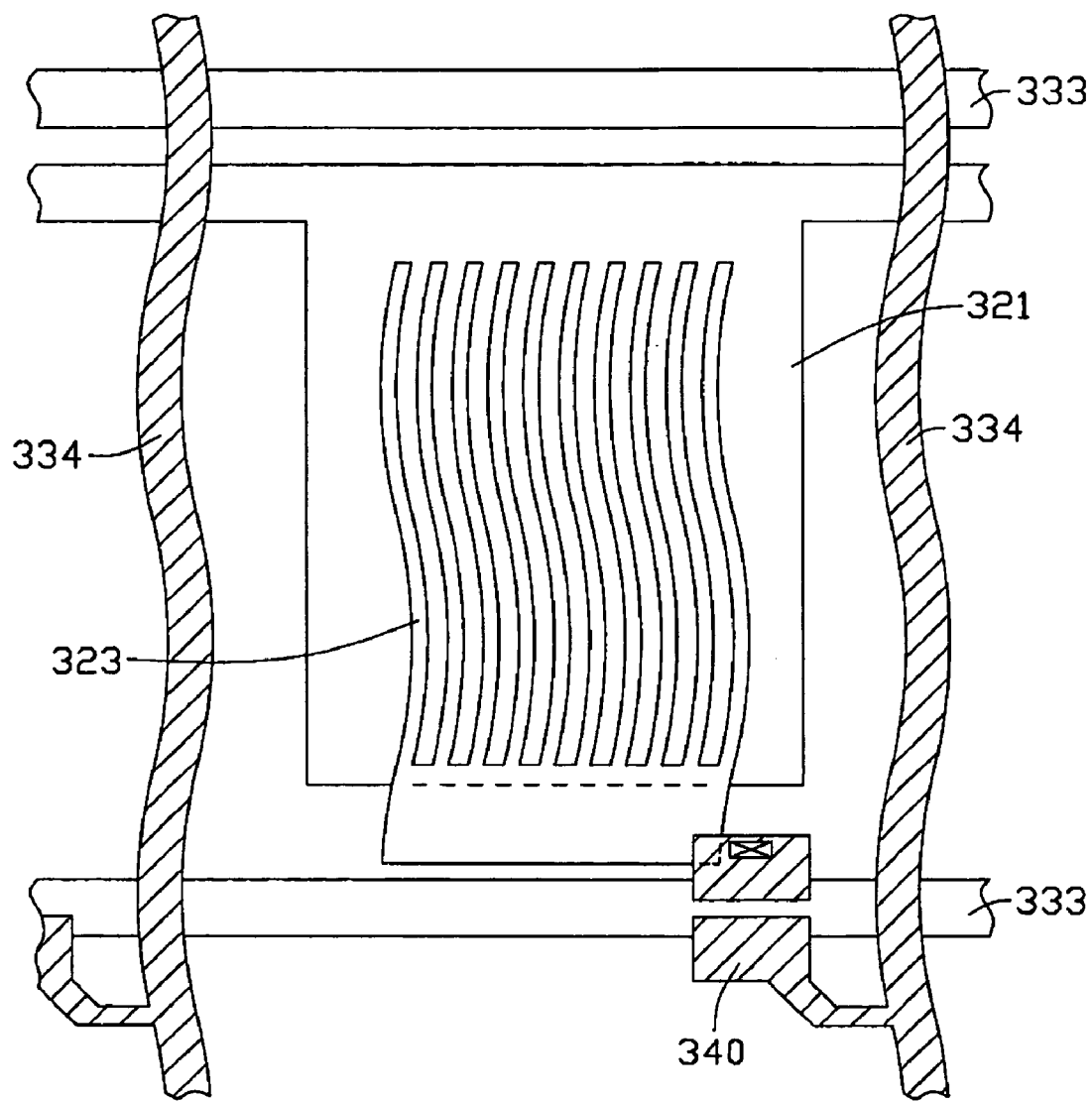
FIG. 3 is a top plan view of a configuration of electrodes of a FFS-LCD device according to a second embodiment of the present invention.
Figure 4:
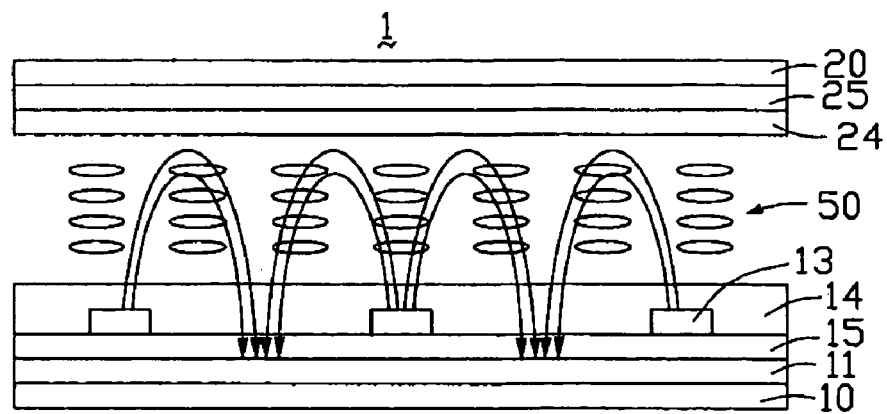
FIG. 4 is a schematic, side cross-sectional view of part of a conventional FFS-LCD device.
Figure 5:
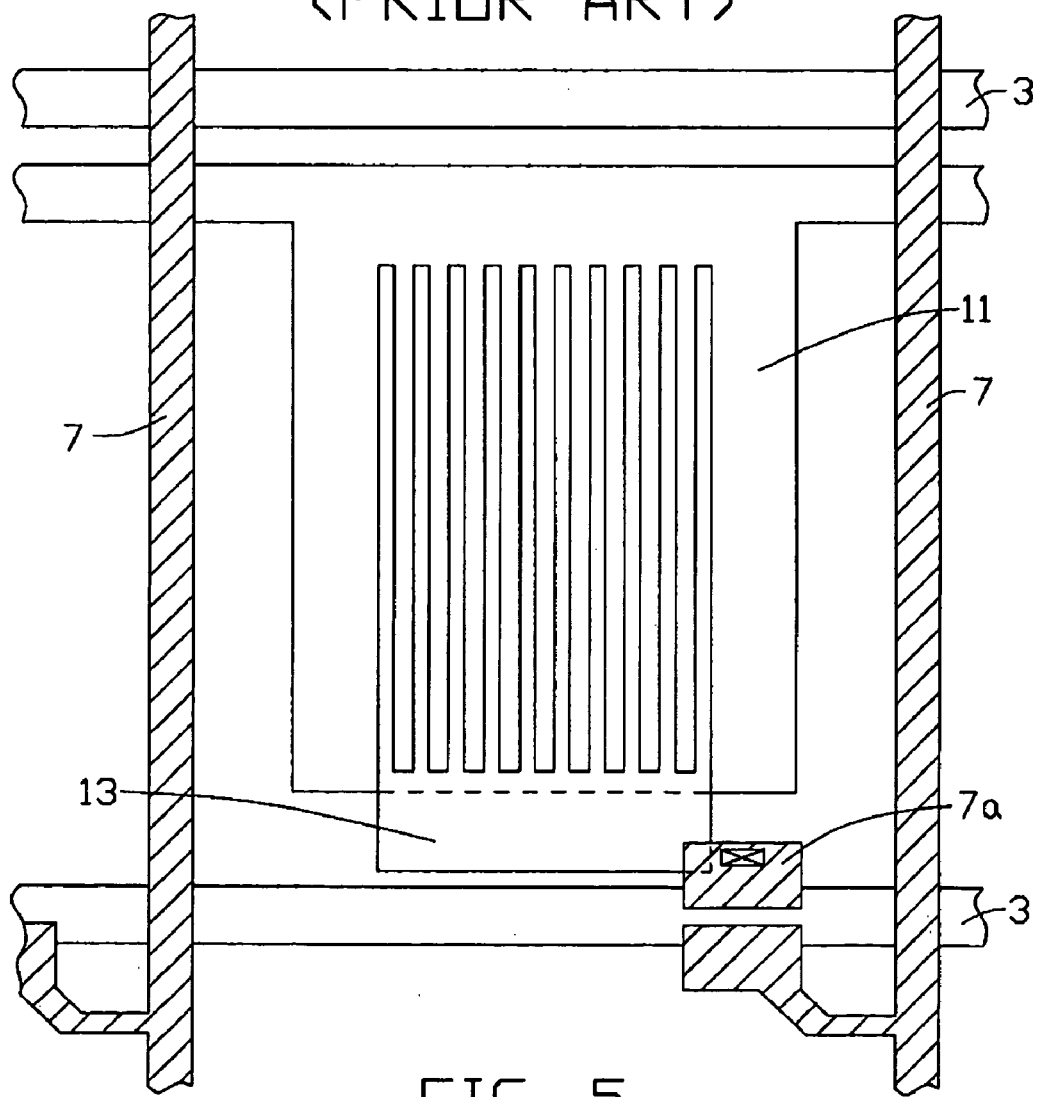
FIG. 5 is a top plan view of a configuration of electrodes of the FFS-LCD device of FIG. 4.
Figure 6:
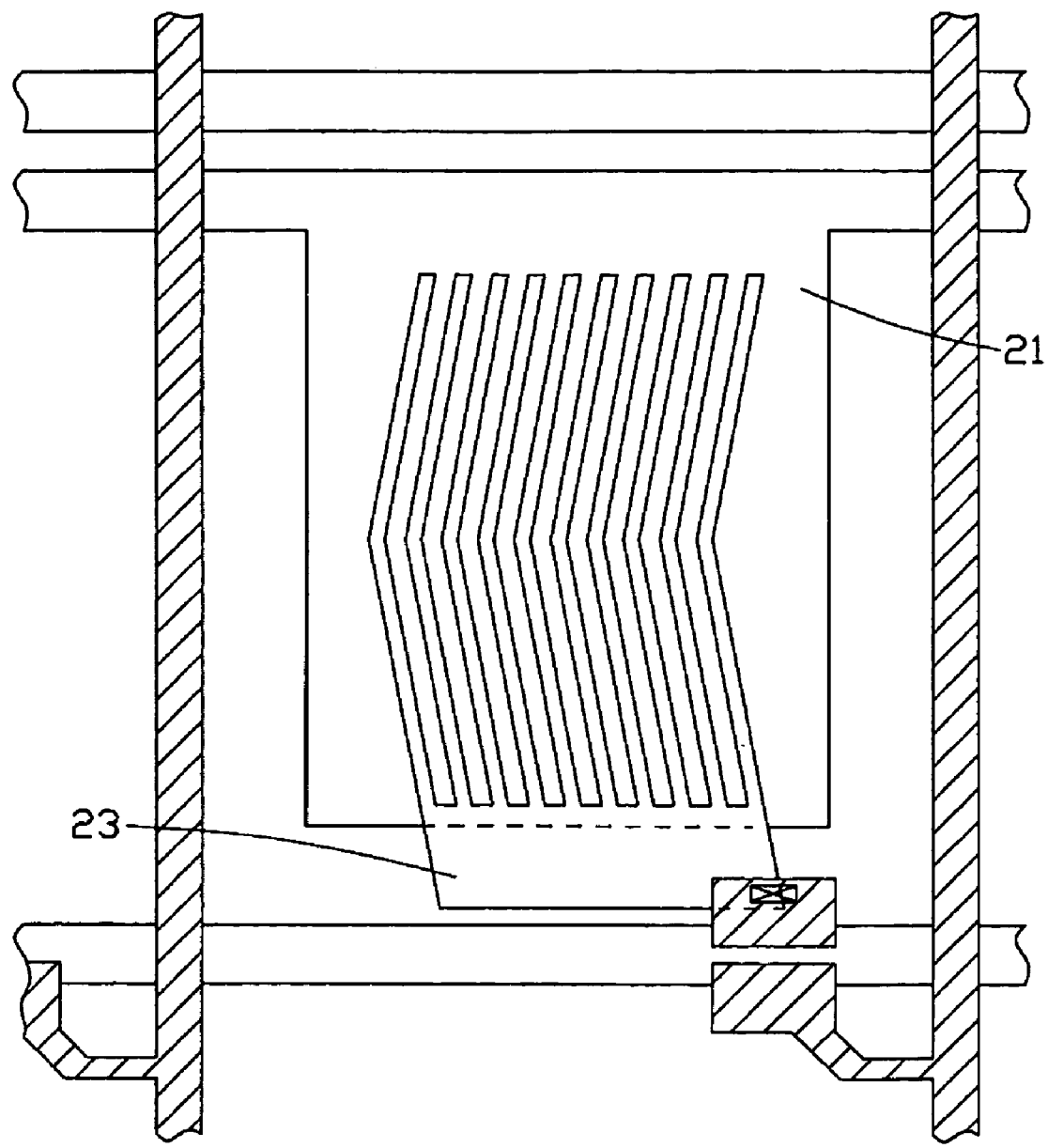
FIG. 6 is a top plan view of a configuration of electrodes of another conventional FFS-LCD device.

Referring to FIG. 3, this is a top plan view showing a configuration of electrodes of an FFS-LCD device according to a second embodiment of the present invention. The FFS-LCD device has a configuration similar to the FFS-LCD device 200 of the first embodiment.

Two parallel gate lines 333 cross two data lines 334, thereby defining a rectangular pixel region. A TFT device 340, a plate-like common electrode 321, and a plurality of pixel electrodes 323 are provided in the pixel region.

The pixel electrodes 323 include a plurality of curving comb portions extending from the wiring. In the illustrated embodiment, the curving comb portions are wavelike. The data lines 334 are shaped similarly to the pixel electrodes 323 so as to reduce the size of non-display areas between the pixel electrodes 323 and the data lines 334. Thus efficient utilization of areas available for displaying is achieved.

In operation, a horizontal electric field with successive contiguous directions continuously varying can be established, so as to form a continuous domain in spaces defined between the common and pixel electrodes 321, 323.

Various modifications and alterations are possible within the ambit of the invention herein. For example, the curving comb portions of the pixel electrodes may be generally "C" shaped or generally "S" shaped.

It is to be understood, however, that even though numerous characteristics and advantages of the embodiments have been set out in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fringe field switching liquid crystal display device, comprising:
   a first substrate and a second substrate disposed opposite to each other and spaced apart a predetermined distance;
   a liquid crystal layer interposed between the first and second substrates;
   a plurality of gate lines and data lines formed on the second substrate, thereby defining a plurality of pixel regions; and
   a plurality of pixel electrodes and a plate-like common electrode provided in each of the pixel regions, the pixel electrodes having a plurality of comb portions, each of the comb portions continuously curving along substantially an entire length thereof.

2. The fringe field switching liquid crystal display device as claimed in claim 1, wherein the comb portions are generally "C" shaped.

3. The fringe field switching liquid crystal display device as claimed in claim 1 wherein the comb portions are generally "S" shaped.

4. The fringe field switching liquid crystal display device as claimed in claim 1, wherein the comb portions are arcuate.

5. The fringe field switching liquid crystal display device as claimed in claim 1, wherein the comb portions are wavelike.

6. The fringe field switching liquid crystal display device as claimed in claim 1, wherein the data lines have curved shapes corresponding to the comb portions of the pixel electrodes.

7. A fringe field switching liquid crystal display device, comprising:

a pair of substrates;

a liquid crystal layer contained between the pair of substrates;

a plurality of gate lines and data lines formed on one of the substrates, thereby defining a plurality of pixel regions; and a plurality of pixel electrodes and a common electrode provided in each of the pixel regions, the pixel electrodes having comb portions separately disposed, each of the comb portions continuously curving along substantially an entire length thereof so as to generate a corresponding continuously varying electric field.

8. The fringe field switching liquid crystal display device as claimed in claim 7, wherein the curving portions are shaped as "C".

9. The fringe field switching liquid crystal display device as claimed in claim 7, wherein the curving portions are shaped as "S".

10. The fringe field switching liquid crystal display device as claimed in claim 7, wherein the curving portions are continuously shaped as "S".

11. The fringe field switching liquid crystal display device as claimed in claim 7, wherein the curving portions have a wave shape.

12. The fringe field switching liquid crystal display device as claimed in claim 7, wherein the data lines have a curving shape corresponding to the curving portions of the pixel electrodes.

* * * * *